(12) United States Patent
Kim et al.

(10) Patent No.: US 12,136,740 B2
(45) Date of Patent: Nov. 5, 2024

(54) ENERGY STORAGE SYSTEM

(71) Applicant: SK Innovation Co., Ltd., Seoul (KR)

(72) Inventors: Suk Chul Kim, Daejeon (KR); Yong Uk Kim, Daejeon (KR); Jong Ho Seok, Daejeon (KR)

(73) Assignee: SK ON CO., LTD., Seoul (KR)

( * ) Notice: Subject to any disclaimer, the term of this patent is extended or adjusted under 35 U.S.C. 154(b) by 294 days.

(21) Appl. No.: 17/181,107

(22) Filed: Feb. 22, 2021

(65) Prior Publication Data

US 2021/0288372 A1   Sep. 16, 2021

(30) Foreign Application Priority Data

Mar. 11, 2020   (KR) ........................ 10-2020-0030298

(51) Int. Cl.
| | | |
|---|---|---|
| *H01M 50/244* | (2021.01) | |
| *H01M 10/613* | (2014.01) | |
| *H01M 10/627* | (2014.01) | |
| *H01M 10/6556* | (2014.01) | |
| *H01M 10/6561* | (2014.01) | |

(Continued)

(52) U.S. Cl.
CPC ....... *H01M 50/244* (2021.01); *H01M 10/613* (2015.04); *H01M 10/627* (2015.04); *H01M 10/6556* (2015.04); *H01M 10/6561* (2015.04); *H01M 10/6566* (2015.04); *H01M 50/204* (2021.01); *H01M 50/209* (2021.01); *H01M 50/211* (2021.01); *H01M 50/251* (2021.01); *H01M 50/258* (2021.01); *H01M 50/276* (2021.01); *H01M 50/282* (2021.01); *H01M 50/289* (2021.01); *H01M 50/367* (2021.01); *H01M 50/383* (2021.01); *H01M 50/531* (2021.01); *H01M 2200/00* (2013.01); *H01M 2220/10* (2013.01)

(58) Field of Classification Search
None
See application file for complete search history.

(56) References Cited

U.S. PATENT DOCUMENTS

| | | | |
|---|---|---|---|
| 2011/0206970 A1* | 8/2011 | Itoi | H01M 10/6557 429/120 |
| 2013/0057074 A1* | 3/2013 | Takano | H02J 9/06 307/66 |

(Continued)

FOREIGN PATENT DOCUMENTS

| | | |
|---|---|---|
| JP | 5420064 B2 | 2/2014 |
| KR | 10-2015-0061200 A | 6/2015 |
| KR | 10-2017-0044473 A | 4/2017 |

*Primary Examiner* — Ula C Ruddock
*Assistant Examiner* — Mary Grace Byram
(74) *Attorney, Agent, or Firm* — IP & T GROUP LLP

(57) ABSTRACT

An energy storage system includes a battery module including a plurality of secondary battery cells and an electrode tab disposed on one or both sides; and a housing accommodating a module stack in which the plurality of battery modules are stacked, wherein the housing includes a first cover disposed to oppose at least one side surface of the module stack on which the electrode tab is disposed, and a second cover disposed to oppose at least one of the side surfaces of the module stack on which the electrode tab is not disposed, and wherein a flame passage is formed between the first cover and the module stack, and a cooling passage is formed between the second cover and the module stack.

13 Claims, 9 Drawing Sheets

(51) Int. Cl.
*H01M 10/6566* (2014.01)
*H01M 50/204* (2021.01)
*H01M 50/209* (2021.01)
*H01M 50/211* (2021.01)
*H01M 50/251* (2021.01)
*H01M 50/258* (2021.01)
*H01M 50/276* (2021.01)
*H01M 50/282* (2021.01)
*H01M 50/289* (2021.01)
*H01M 50/367* (2021.01)
*H01M 50/383* (2021.01)
*H01M 50/531* (2021.01)

(56) References Cited

U.S. PATENT DOCUMENTS

| | | | |
|---|---|---|---|
| 2014/0011056 A1* | 1/2014 | Adachi | B60L 3/0046 429/7 |
| 2015/0147605 A1* | 5/2015 | Kim | H01M 50/394 429/53 |
| 2019/0088914 A1* | 3/2019 | Choi | H01M 50/211 |

* cited by examiner

III-III'

ENERGY STORAGE SYSTEM

CROSS-REFERENCE TO RELATED APPLICATION (S)

This application claims benefit of priority to Korean Patent Application No. 10-2020-0030298 filed on Mar. 11, 2020 in the Korean Intellectual Property Office, the disclosure of which is incorporated herein by reference in its entirety.

BACKGROUND

Example embodiments of the present disclosure relate to an energy storage system.

As development of technology related to mobile devices, electric vehicles, and energy storage systems (ESS) and demand therefor have increased, demand for a secondary battery cell as an energy source has rapidly increased. A secondary battery cell is a battery which may be repeatedly charged and discharged as mutual conversion between chemical energy and electrical energy is reversible.

Such a secondary battery cell may include an electrode assembly including a positive electrode, a negative electrode, a separator, and an electrolyte, major components of a secondary battery, and a cell body member of a laminated film case protecting the above elements.

However, such an electrode assembly may generate heat while being charged and discharged, and an increase of temperature caused by the heat generation may degrade performance of the secondary battery cell.

Also, when the heat generation becomes severe, internal pressure of the secondary battery cell may increase, such that the secondary battery cell may be ignited.

Further, when a plurality of secondary battery cells are mounted, such as an energy storage system (ESS), the secondary battery cell may explode along with the ignition and the flame may propagate to surrounding secondary battery cells.

As an example, in the related art, as there is no cover member to prevent the flame from spreading into an electrode tab of a secondary battery cell, when a fire occurs in a neighboring secondary battery cell, the flame may easily spread to an adjacent secondary battery cell.

Therefore, to address the above-described issue or limitation, there has been a need for research on an energy storage system.

SUMMARY

An example embodiment of the present disclosure is to provide an energy storage system which may prevent ignition and spreading of fire in a secondary battery cell.

An example embodiment of the present disclosure is to provide an energy storage system which may prevent flames from spreading externally from a secondary battery cell when the secondary battery cell ignites.

According to an example embodiment of the present disclosure, an energy storage system includes a battery module including a plurality of secondary battery cells and an electrode tab disposed on one or both sides; and a housing accommodating a module stack in which the plurality of battery modules are stacked, wherein the housing includes a first cover disposed to oppose at least one side surface of the module stack on which the electrode tab is disposed, and a second cover disposed to oppose at least one of the side surfaces of the module stack on which the electrode tab is not disposed, and wherein a flame passage is formed between the first cover and the module stack, and a cooling passage is formed between the second cover and the module stack.

The energy storage system may further include a spacer disposed between the first cover and the module stack and maintaining a spacing between the module stack and the first cover.

The first cover and the second cover may be formed by bending a metal plate.

The cooling passage may be formed as an independent passage separated from the flame passage.

The housing may further include a partition wall disposed along a portion in which the first cover may be connected to the second cover, and configured to be in contact with the module stack and to partition the cooling passage from the flame passage.

The energy storage system may further include a blocking member disposed in the flame passage and passing gas and blocking flame.

The blocking member may be formed as a multilayer metal mesh net or a multilayer baffle for cooling flame.

The energy storage system may further include a second cooling passage formed between the stacked battery modules and connected to the cooling passage.

Each of the battery modules may include a protrusion protruding from an upper surface or a lower surface thereof, and the second cooling passage may be formed in a space between the battery modules spaced apart from each other by the protrusion.

The protrusion may be disposed adjacent to an edge of the battery module, and may be disposed linearly in a direction orthogonal to a length direction of the secondary battery cells.

The battery module may include a cell unit accommodating the plurality of secondary battery cells, a body frame member integrally combining the plurality of cell units with each other, and a cover member coupled to one side or both sides of the secondary battery cell on which the electrode tab is disposed, and the cover member may be disposed between the flame passage and the electrode tab and includes a plurality of through-holes through which flame or gas passes.

The cell unit may include a cell support member accommodating the secondary battery cell on a side surface portion thereof, and a case member surrounding a side surface of the secondary battery cell and coupled to the cell support member.

The housing may further include an upper cover disposed in an upper portion of the module stack and a lower cover disposed in a lower portion.

The housing may further include a third cover extending from the second cover and disposed on an opposite side of the first cover.

The energy storage system may further include a third cover disposed side by side with the first cover and disposed to oppose the other side surface of the module stack on which the electrode tab is disposed, and each of the first cover and the third cover may extend from the second cover.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
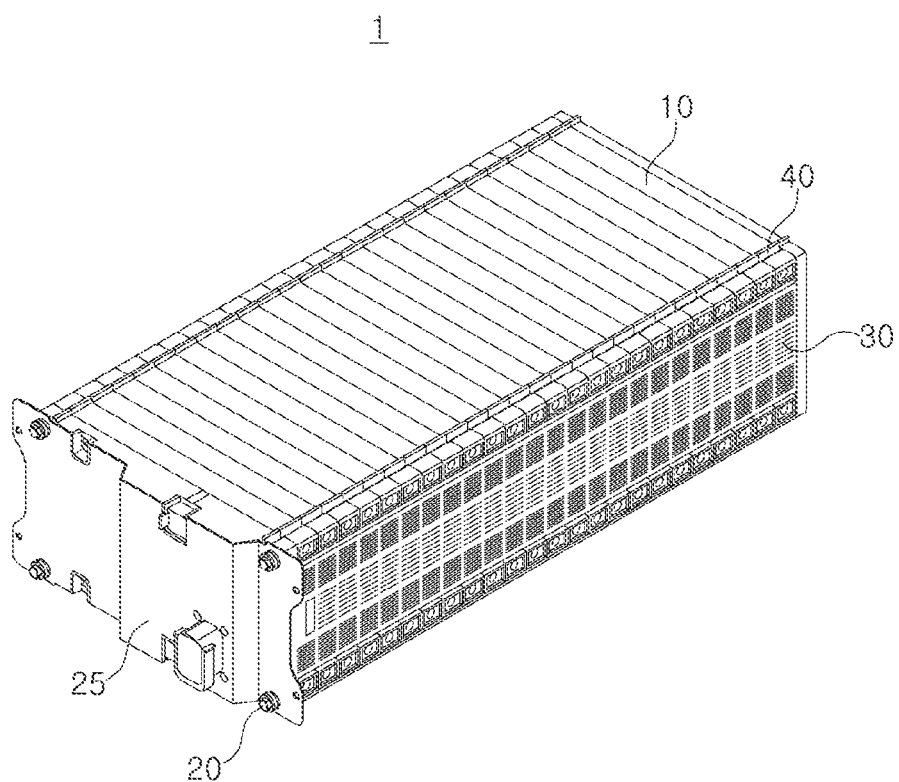
FIG. 1 is a perspective diagram illustrating a battery module according to an example embodiment of the present disclosure.

Hereinafter, example embodiments of the present disclosure will be described as follows with reference to the accompanying drawings. However, the example embodiment may be implemented in various ways, and are not limited to the example embodiments described herein. Also, illustrations of elements having nothing to do with the explanation of the present disclosure are omitted from the drawings to clearly explain the present disclosure. Throughout the specification, similar reference numerals are used for similar elements.

A singular term includes a plural form unless it is intentionally written that way, and the same elements will be indicated by the same reference numerals.

Figure 2:
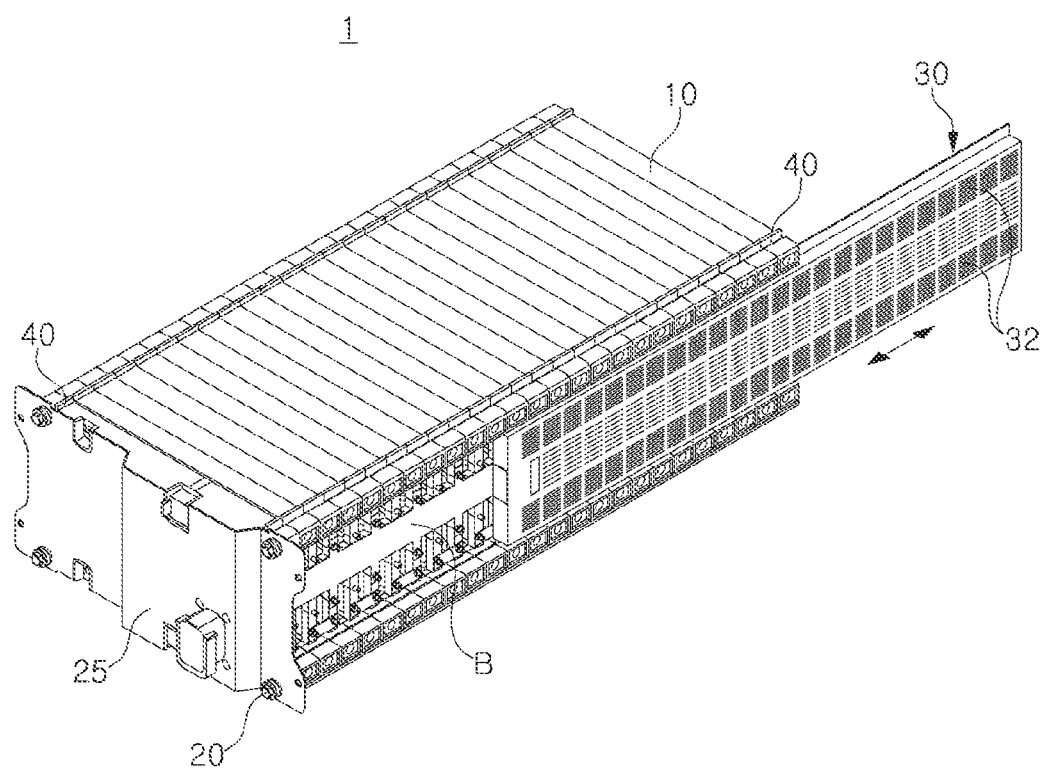
FIG. 2 is an exploded perspective diagram illustrating a portion of the battery module illustrated in FIG. 1.
Figure 3:
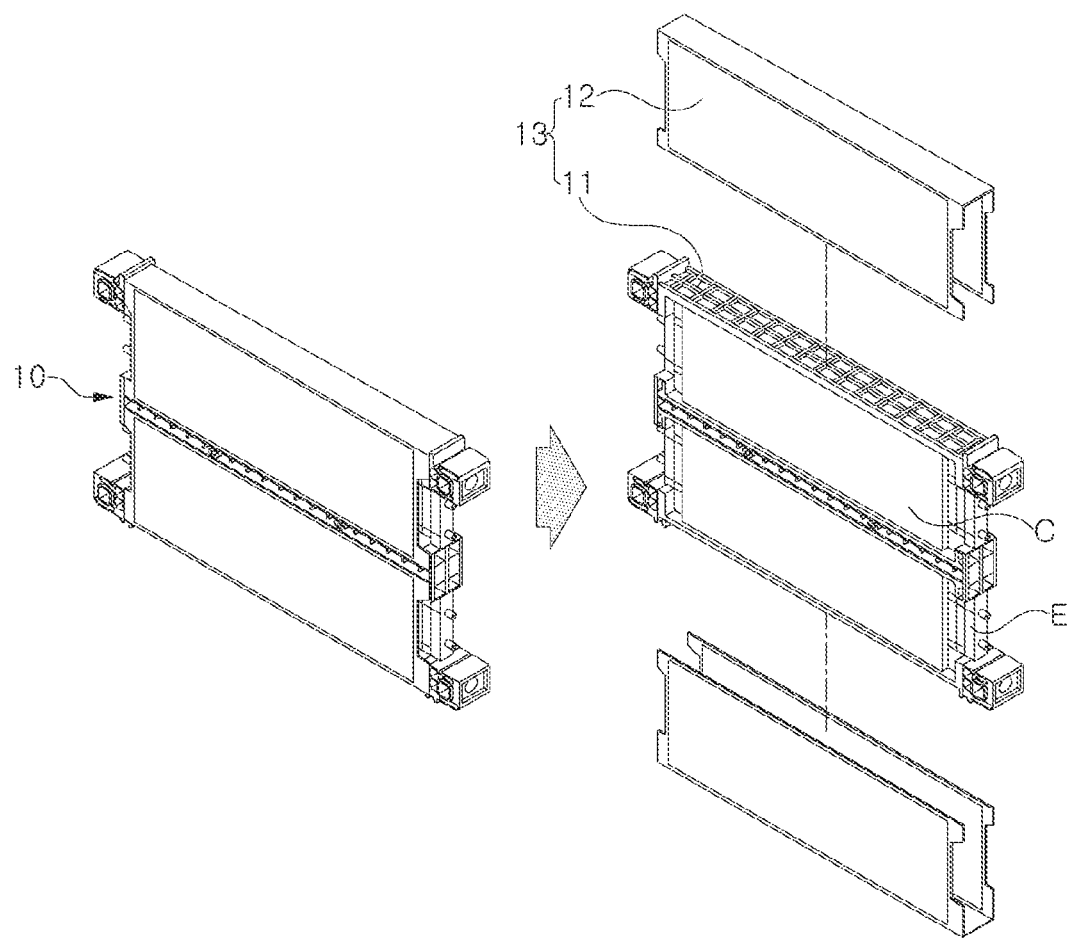
FIG. 3 is a perspective diagram illustrating a cell unit according to an example embodiment of the present disclosure.

FIG. 1 is a perspective diagram illustrating a battery module according to an example embodiment. FIG. 2 is an exploded perspective diagram illustrating a portion of the battery module illustrated in FIG. 1. FIG. 3 is a perspective diagram illustrating a cell unit according to an example embodiment.

Referring to the drawings, the battery module in the example embodiment may include a cell unit 10 including a plurality of secondary battery cells C, a body frame member 20 integrally combining a plurality of the cell units 10, a front cover 25, and a cover member 30.

The secondary battery cell C may be accommodated in the cell unit 10, and to this end, the cell unit 10 may include a cell support member 11 and a case member 12.

The cell support member 11 may provide a space in which the secondary battery cell C is accommodated. Specifically, a seating portion having a groove shape corresponding to a shape of the secondary battery cell C may be disposed on both surfaces of the cell support member 11. Accordingly, the secondary battery cell C may be inserted into the seating portion formed on both surfaces of the cell support member 11, and may be coupled to the cell support member 11.

In the example embodiment, the cell support member 11 may accommodate four secondary battery cells C, two secondary battery cells per surface. However, an example embodiment thereof is not limited thereto.

The case member 12 may be coupled to the cell support member 11 by surrounding the side surface of the secondary battery cell C. To this end, the case member 12 may have a "E" shape. Accordingly, the case member 12 may be inserted into and coupled to the cell support member 11 in upper and lower portions of the cell support member 11 to which the secondary battery cell C is coupled.

The cell support member 11 may be coupled to the case member 12, and accordingly, a portion of the secondary battery cell C, other than the electrode tab E portion, may be disposed in a space formed by the cell support member 11 and the case member 12.

The electrode tab E of the secondary battery cell C may be exposed externally of the cell support member 11. A bus bar B may be fastened to the electrode tab E. The secondary battery cell C may be electrically connected to an external entity through the bus bar B.

The body frame member 20 may integrally combine the plurality of cell units 10 as a single battery module 1.

The body frame member 20 may have a box shape in which the plurality of cell units 10 are accommodated, or may have a bar-shaped frame in which the plurality of cell units 10 are connected to each other.

In the example embodiment, the body frame member 20 may include a plurality of shafts penetrating the cell support member 11 and a closing member fastened to both ends of the shaft and prevent the cell unit from moving. For example, the body frame member 20 in the example embodiment may include a fastening member such as a nut and a bolt, but an example embodiment thereof is not limited thereto.

The front cover 25 may be a cover disposed on one surface of the battery module 1 coupled by the body frame member 20, and may be formed of a metal material resistant to heat.

The front cover 25 may be disposed to cover an entire surface of the battery module 1.

Also, connection members such as a connector may be disposed on the front cover 25 to electrically connect the cell unit 10 to an external entity.

Figure 4:
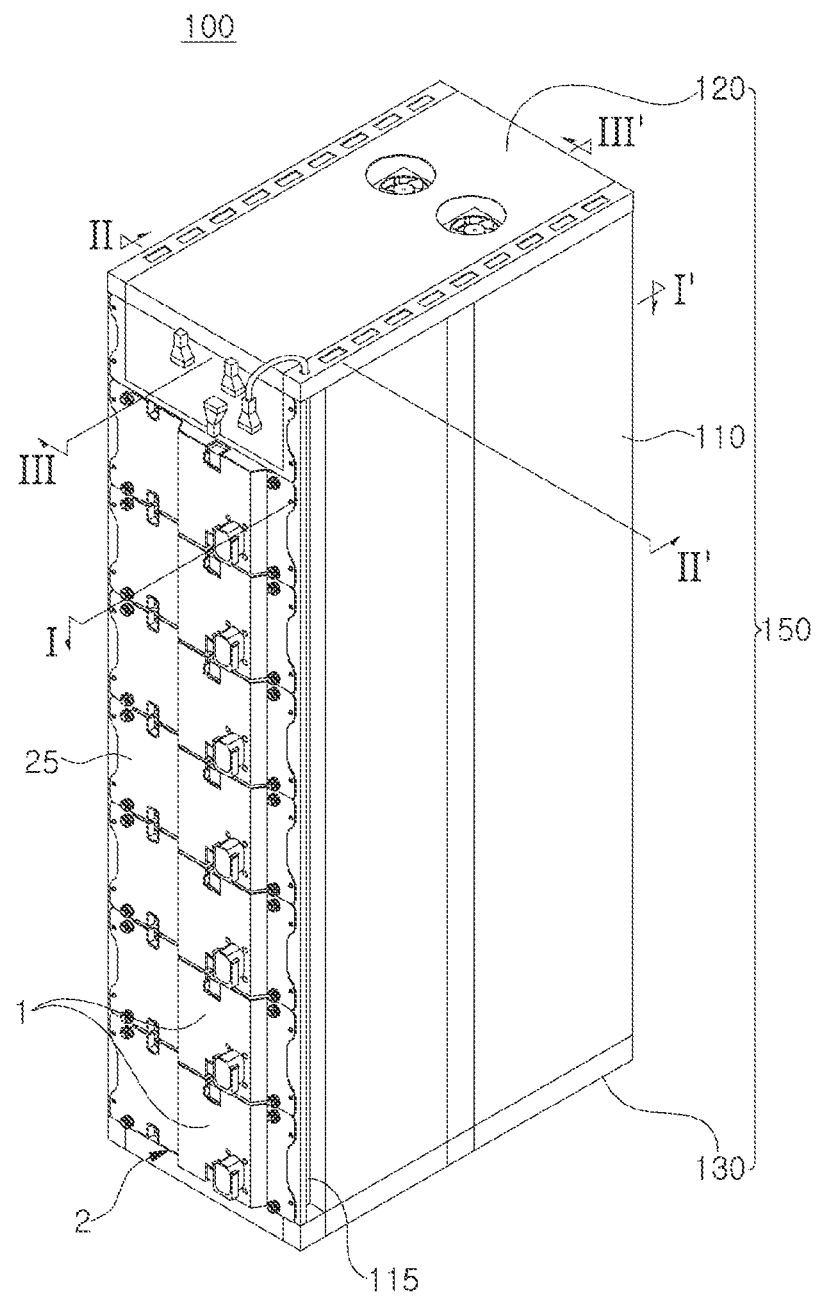
FIG. 4 is a perspective diagram illustrating an energy storage system according to an example embodiment of the present disclosure.

When a plurality of battery modules 1 are stacked, the front cover 25 may form one side surface of the energy storage system as illustrated in FIG. 4.

The cover member 30 may be coupled to the body frame member 20 or the cell support member 11 to block one side of the secondary battery cell C on which the electrode tab E is disposed. Accordingly, the cover member 30 may be disposed in a position opposing the electrode tab E and may form a side surface of the battery module 1.

The cover member 30 may include a plurality of through-holes 32. The through-hole 32 may be used as a passage through which flame or gas is discharged externally of the battery module when a flame is generated in the secondary battery cell C. Accordingly, a plurality of through-holes 32 may be evenly arranged throughout the cover member 30.

When the through-hole 32 is not provided in the cover member 30, it may be difficult for a flame to be discharged externally of the battery module 1, and in this case, the flame may be easily transferred to another adjacent secondary battery cell.

To address the above issue, the cover member 30 in the example embodiment may include a through-hole 32, and accordingly, a flame may pass through the through-hole 32 and may be formed towards the flame passage F1. The through-hole 32 may also provide a function of guiding the flame to the flame passage F1.

The cover member 30 may be formed of a material that is not easily deformed by heat as the cover member 30 should withstand the flame. Accordingly, a material of the cover member 30 is not limited to any particular material, and any material that is not easily melted or deformed by high temperature heat may be used as a material of the cover member 30.

Since the battery module 1 configured as above covers the secondary battery cell C with the case member 12, most of the flames may be directed in a direction in which the electrode tab E of the secondary battery cell C is disposed. Accordingly, the energy storage system in the example embodiment may have a flame passage in the direction in which the electrode tab E is disposed.

In the description below, an energy storage system will be described in accordance with an example embodiment.

Figure 5:
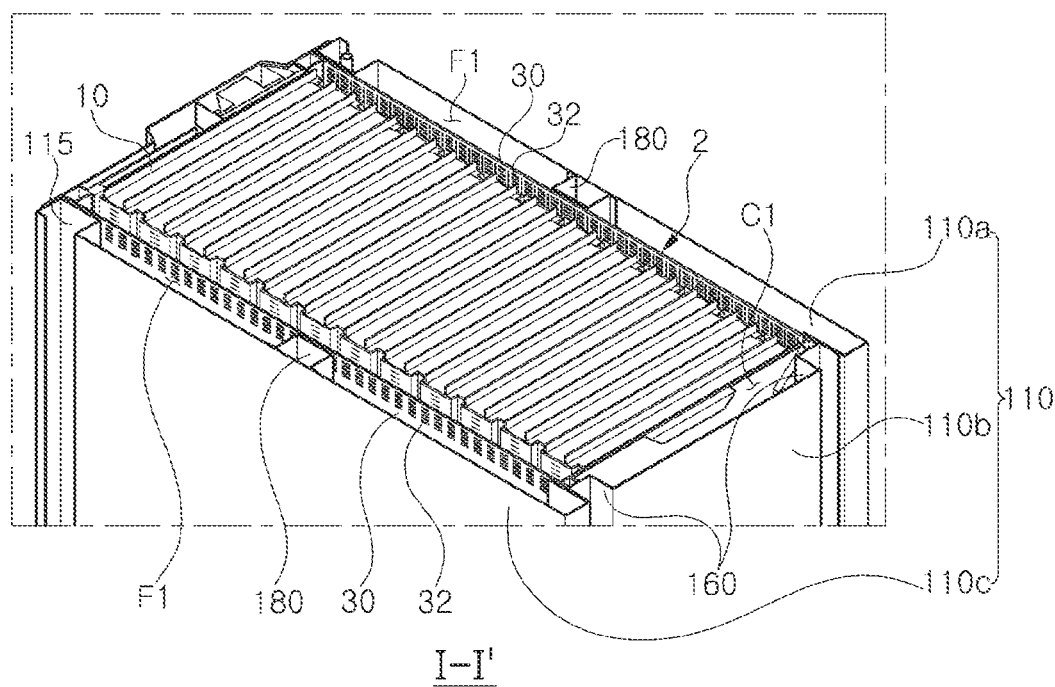
FIG. 5 is a cross-sectional diagram taken along line I-I' in FIG. 4.
Figure 6:
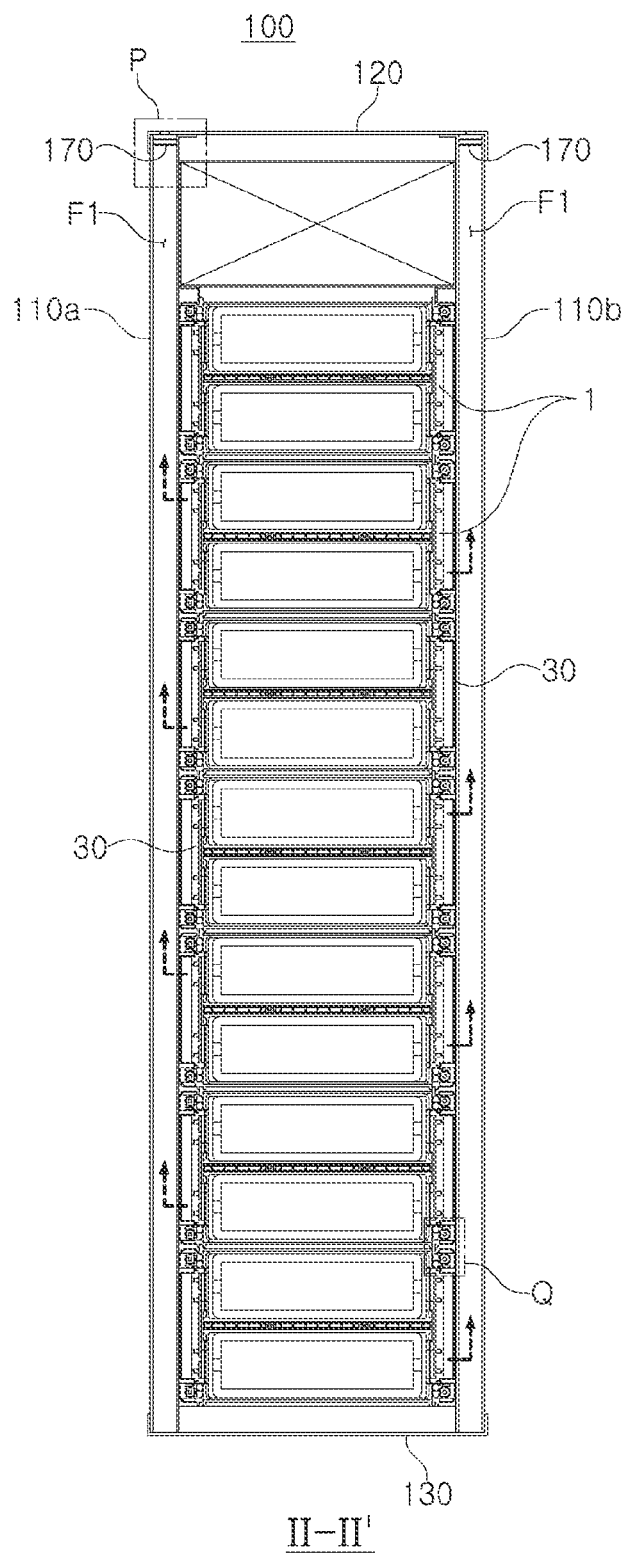
FIG. 6 is a cross-sectional diagram taken along line II-II' in FIG. 4.

FIG. 4 is a perspective diagram illustrating an energy storage system according to an example embodiment. FIG. 5 is a cross-sectional diagram taken along line I-I' in FIG. 4. FIG. 6 is a cross-sectional diagram taken along line II-II' in FIG. 4.

Figure 7:
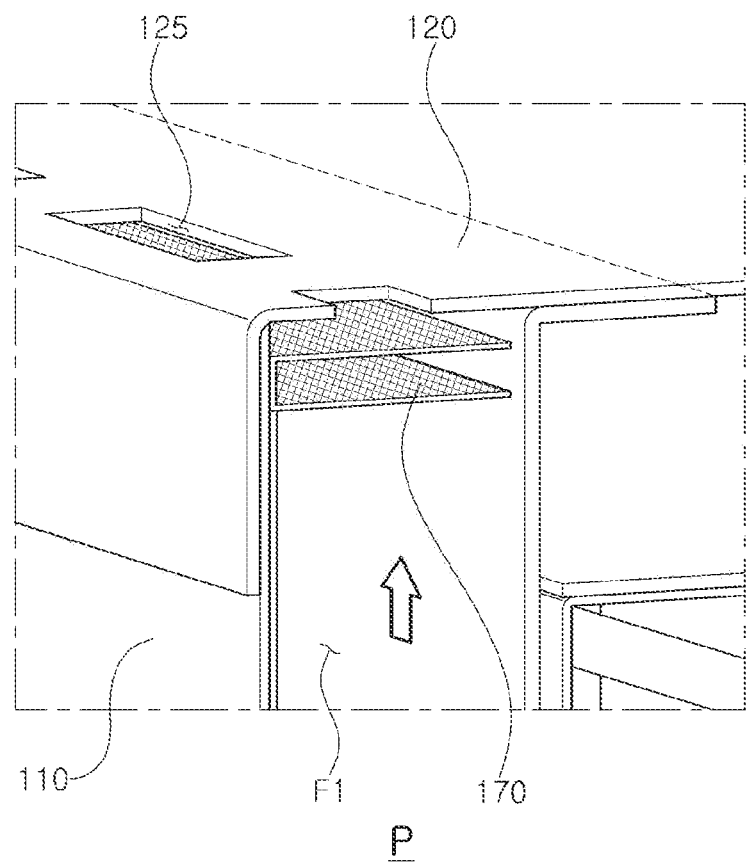
FIG. 7 is an enlarged diagram illustrating portion P illustrated in FIG. 6.
Figure 8:
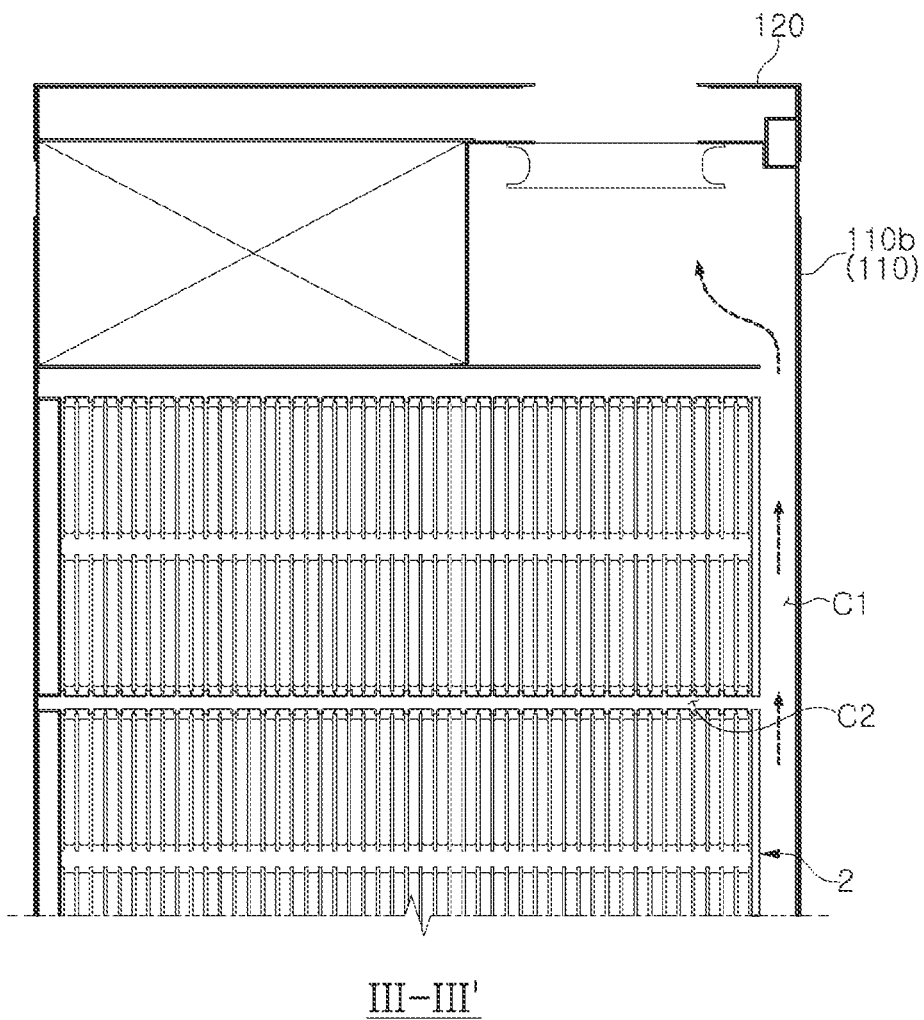
FIG. 8 is a cross-sectional diagram taken along line III-III' in FIG. 4.
Figure 9:
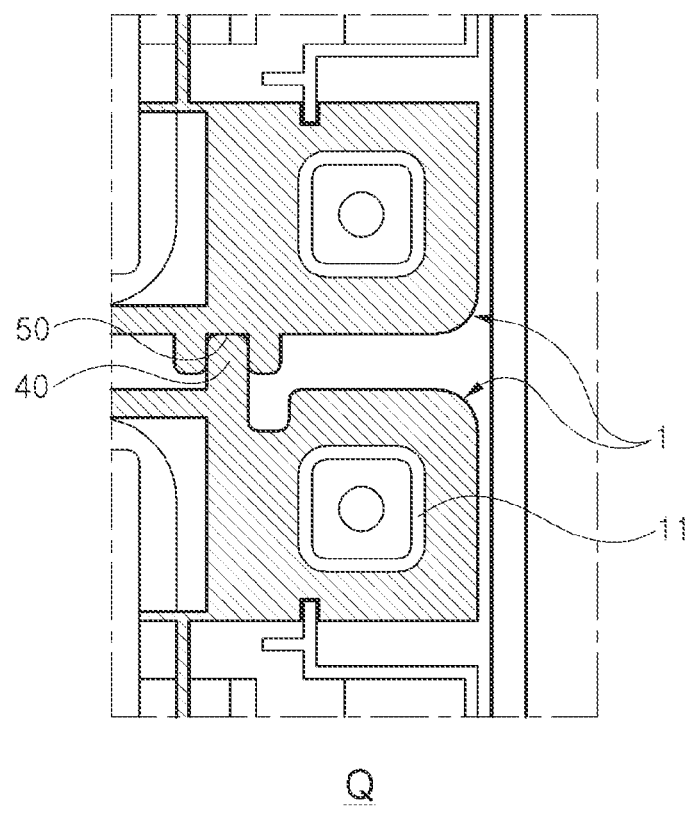
FIG. 9 is an enlarged cross-sectional diagram illustrating portion Q illustrated in FIG. 6.

FIG. 7 is an enlarged diagram illustrating portion P illustrated in FIG. 6. FIG. 8 is a cross-sectional diagram taken along line III-III' in FIG. 4. FIG. 9 is an enlarged cross-sectional diagram illustrating portion Q illustrated in FIG. 6.

Referring to the drawings, the energy storage system 100 in the example embodiment may include a module stack 2 in which a plurality of the aforementioned battery modules 1 are stacked, and a housing 150 for accommodating the module stack 2.

The housing 150 may include an upper cover 120 coupled to an upper portion of the module stack 2, a lower cover 130 coupled to a lower portion, and a side cover 110 disposed to cover a side surface of the module stack 2.

A plurality of battery modules 1 may be stacked in a vertical direction and may be accommodated in the housing 150. In this case, the plurality of battery modules 1 may be stacked such that the electrode tabs E may be directed in the same direction.

The battery module 1 in the example embodiment may include a secondary battery cell C in which the electrode tabs E are disposed in both directions. Accordingly, the electrode tabs E may be disposed to be directed in two opposite directions.

Accordingly, the housing 150 may include first and third covers 110a and 110c disposed to oppose a side surface of the module stack 2 on which the electrode tab E is disposed, and a second cover 110b connecting the first cover 110a to the third cover 110c. Accordingly, the third cover 110c may extend from the second cover 110b and may be disposed on an opposite side surface of the first cover 110a.

Here, the second cover 110b may be disposed to oppose a side surface of the module stack 2 on which the electrode tab E is not disposed. Accordingly, in the example embodiment, the side cover 110 may have a "⊏" shape.

Specifically, the first cover 110a, the second cover 110b, and the third cover 110c, which are the side cover 110, may be formed by bending a single metal plate. For example, a single metal plate may be formed as the first cover 110a and the third cover 110c disposed side by side with each other, and the second cover 110b connecting the first cover 110a to the third cover 110c on one side by being bent to have a "⊏" shape.

When the side cover is configured as above, a gap which may be formed by a coupling member coupled to a portion in which the first cover 110a is connected to the second cover 110b and a potion in which the second cover 110b is connected to the third cover 110c or by welding defects may not be formed. Thus, flame or gas may be prevented from being discharged externally through the connected portions.

However, an example embodiment thereof is not limited thereto.

As the side cover is formed in a "⊏" shape, when the housing 150 in the example embodiment is combined with the module stack 2, one surface of the module stack 2 may be exposed externally of a housing 150.

As described above, a front cover 25 formed of a metal material may be disposed on one surface of the exposed module stack 2. Accordingly, the first cover 110a and the third cover 110c may be combined to the front cover 25 of the module stack 2.

In this case, when a gap is formed in the portion at which the first cover 110a, the third cover 110c, and the front cover 25 are combined, flame or smoke may leak externally through the gap. Accordingly, the first cover 110a, the third cover 110c, and the front cover 25 may be firmly combined such that the gap may not be formed.

To this end, the first cover 110a and the third cover 110c may include a blocking wall 115 in contact with the module stack 2.

The blocking wall 115 may be bent along the portion at which the first cover 110a, the third cover 110c, and the front cover 25 are combined and may be in contact with the module stack 2.

Accordingly, the blocking wall 115 may function as a member for partitioning the flame passage F1, and the flame of the flame passage F1 may not be exposed to the front cover 25 by the blocking wall 115.

The first cover 110a and the third cover 110c may be spaced apart from the module stack 2 by a predetermined distance. To this end, at least one spacer 180 may be disposed on internal surfaces of the first cover 110a and the third cover 110c as illustrated in FIG. 5.

The spacer 180 may be disposed between the first cover 110a and the module stack 2 and between the third cover 110c and the module stack 2, and may maintain a spacing between the module stack 2 and the first and third covers 110a and 110c.

The spacer 180 may be formed by bending a metal plate, but an example embodiment thereof is not limited thereto. The spacer 180 may be varied, being formed of various materials as long as the spacer 180 may allow the first cover 110a and the 110c to be spaced apart from the battery module 1 and may withstand flame for a substantial period of time.

In the example embodiment, as the first cover 110a and the third cover 110c are spaced apart from the module stack 2, the space formed between the housing 150 and the module stack 2 may work as a passage F1 (hereinafter, referred to as a flame passage) which may induce flame.

As described above, in the battery module 1 in the example embodiment, when a flame is generated in the secondary battery cell C, the flame is diffused only to the electrode tab E side. The diffusion of the flame may be primarily blocked through the cover member 30, but the flame spreading externally of the cover member 30 through the through-hole 32 of the cover member 30 may spread only to the flame passage F1 provided between the first cover 110a and the third cover 110c and the module stack 2.

The flame spread into the flame passage F1 may be directed to an upper portion (the direction of the arrow in FIG. 6) of the energy storage system 100 through the flame passage F1. Therefore, the flame may be prevented from spreading to the other battery module 1.

Meanwhile, to prevent the flame from being exposed externally of the energy storage system 100, at least one blocking member 170 may be provided in the flame passage F1.

In the example embodiment, the blocking member 170 may be disposed on an uppermost end side of the flame passage F1 and may be formed of a metal mesh. The mesh net may be formed a fine mesh filter and may block flame and may only allow gas or smoke to pass.

Therefore, the flame spreading into the flame passage F1 may be completely blocked from spreading externally of the energy storage system 100 by the blocking member 170.

An exhaust hole 125 for discharging gas or smoke may be provided in the upper cover 120 coupled to the upper portion of the module stack 2. The exhaust hole 125 may be disposed in a position corresponding to the flame passage F1.

Meanwhile, in the example embodiment, the blocking member 170 may be disposed only on the uppermost end side of the flame passage F1, but an example embodiment thereof is not limited thereto, and the blocking member 170 may be additionally disposed in various positions in the flame passage F1 if desired.

Also, in the example embodiment, the blocking member 170 is not limited to a mesh net, and the blocking member 170 may also be implemented by a baffle in which plates having a plurality of holes are provided in a plurality of layers. The blocking member 170 may be varied as long as the blocking member 170 may discharge smoke and gas and may block the spread of the flame at the same time.

Also, the energy storage system 100 in the example embodiment may include cooling passages C1 and C2.

The cooling passages C1 and C2 may be configured as independent passages completely separated from the flame passage F1.

The cooling passages C1 and C2 in the example embodiment may include the first cooling passage C1 provided between the housing 150 and the module stack 2, and the second cooling passage C2 provided in the module stack 2, between the battery modules 1.

The first cooling passage C1 may be formed as a space between the second cover 110b and the module stack 2. Accordingly, the second cover 110b may be spaced apart from the module stack 2 by a predetermined distance.

In the example embodiment, a spacer may not be disposed between the second cover 110b and the module stack 2, but an example embodiment thereof is not limited thereto, and a spacer may be disposed between the second cover 110b and the module stack 2 depending on a size of the second cover 110b.

The housing 150 in the example embodiment may be partially bent to form a partition wall 160 so as to form the first cooling passage C1 as illustrated in FIG. 5.

The partition wall 160 may be formed along a portion in which the first cover 110a is connected to the second cover 110b and a portion in which the third cover 110c is connected to the second cover 110b. The partition wall 160 may be configured to be in contact with the module stack 2 when the housing 150 is combined with the module stack 2.

Accordingly, the partition wall 160 may function as a member for partitioning the first cooling passage C1 from the flame passage F1, and the flame of the flame passage F1 may not spread to the first cooling passage C1 side by the partition wall 160.

When the partition wall 160 is formed by bending a single metal plate as above, the first cooling passage C1 and the flame passage F1 may be formed with only a single metal plate without a separate member such that the manufacturing process may be simplified and manufacturing costs may be reduced.

The second cooling passage C2 may be formed as a space between the stacked battery modules 1. As illustrated in FIG. 8, in the energy storage system 100 in the example embodiment, a space may be formed between the two stacked battery modules 1 and may be used as the second cooling passage C2.

To this end, the battery module 1 may include a protrusion 40 on an upper surface and an insertion portion 50 on a lower surface as illustrated in FIG. 9.

By the protrusion 40, each of the stacked battery modules 1 may be spaced apart from each other by a predetermined distance in a stacking direction, and the space between the battery modules 1 may be used as a second cooling passage C2.

In the example embodiment, the protrusion 40 may be formed linearly along a direction orthogonal to a length direction of the secondary battery cells C, and may protrude upwardly from an upper surface of the battery module 1 by a certain distance. Also, when the battery modules 1 are vertically stacked, the insertion portion 50 may be formed as a groove into which at least a portion of the protrusion 40 is inserted. Therefore, the insertion portion 50 may be disposed in a position opposing the protrusion 40 when the battery modules 1 are vertically stacked.

Referring to FIG. 2, in the example embodiment, two protrusions 40 may be disposed side by side with the edge in vicinity of the edge adjacent to the electrode tab E of the upper surfaces of the battery module 1. Similarly, two insertion portions 50 may also be disposed side by side with the edge adjacent to the electrode tab E on the lower surface of the battery module 1.

Accordingly, the second cooling passage C2 may be formed as a space between the two protrusions 40 or the two insertion portions 50, and may be separated from a space in which the electrode tabs E of the secondary battery cells C are disposed.

One side of the second cooling passage C2 may be connected to the first cooling passage C1. The other side thereof may be connected to an external portion of the energy storage system 100. Accordingly, air outside the energy storage system 100 may flow into the energy storage system 100 through the second cooling passage C2, may move to an upper portion or a lower portion of the energy storage system 100 through the first cooling passage C1, and may be discharged externally of the energy storage system 100. For efficient cooling, a cooling fan may be provided in an upper portion the first cooling passage C1.

In the example embodiment, the protrusion 40 and the insertion portion 50 may be disposed on the cell support member 11. However, an example embodiment thereof is not limited thereto, and the protrusion 40 and the insertion portion 50 may be varied, being arranged as separate members and combined with the battery module 1.

In the example embodiment, the protrusion 40 may be disposed on the upper surface of the battery module 1 and the insertion portion 50 may be disposed on the lower surface, but an example embodiment thereof is not limited thereto. The protrusion 40 may be disposed on a lower surface of the battery module 1 and the insertion portion 50 may be disposed on an upper surface of the battery module 1.

Also, the insertion portion 50 may not be provided, and the battery module 1 may be configured to include only the protrusion 40. In this case, another member for aligning the stacked battery modules 1 may be added.

In the energy storage system 100 in the example embodiment configured as above, since the cooling passages C1 and C2 are completely separated from the flame passage F1, even when a fire occurs in the secondary battery cell C, the fire may be prevented from spreading to another secondary battery cell C through the cooling passages C1 and C2.

Also, since the cover member 30 is disposed on the electrode tab E side of the battery module 1 to induce flame, gas, and smoke into the flame passage F1, the spreading of flame to another secondary battery cell C may be reduced.

Also, by providing the flame passage F1 and the blocking member 170, flame may spread only through the flame passage F1 in the housing when a fire occurs, and the flame may be prevented from spreading externally of the housing 150 by the blocking member 170. Accordingly, even when a fire occurs in one of the energy storage system 100, the flame may be prevented from spreading to the other energy storage system 100.

Also, since the flame or gas may be induced in a desired direction through the flame passage F1, the energy storage system 100 may be connected to a supply and exhaust apparatus and fire extinguishing facilities.

Also, since the flame and gas may emit heat through the side cover 110 or the blocking member 170, the possibility of spreading of fire caused by the temperature of heat may be reduced through the cooling.

Also, since the "⊏" shaped side cover is configured to be firmly combined with the front cover of the battery module 1, the flame may be prevented from leaking to the front cover side, and even when an external shock occurs, the housing structure may be firmly maintained.

According to the aforementioned example embodiment, in the energy storage system, since the cooling passage is completely separated from the flame passage, even when a fire occurs in the secondary battery cell, the spreading of fire to another secondary battery cell may be prevented through the cooling passage.

While the example embodiments have been illustrated and described above, it will be apparent to those skilled in the art that modifications and variations could be made without departing from the scope of the present disclosure as defined by the appended claims.

What is claimed is:

1. An energy storage system, comprising:
    a plurality of battery modules including a plurality of secondary battery cells, wherein electrode tabs of the plurality of secondary battery cells are disposed on one or both sides of each battery module; and
    a housing accommodating a module stack in which the plurality of battery modules are stacked,
    wherein the housing includes:
        a first cover disposed to oppose at least one side surface of the module stack on which the electrode tab is disposed; and
        a second cover disposed to oppose at least one of the side surfaces of the module stack on which the electrode tab is not disposed,
    wherein a flame passage is formed between the first cover and the module stack, and a cooling passage is formed between the second cover and the module stack, and the cooling passage is formed as an independent passage separated from the flame passage,
    wherein each of the plurality of battery modules includes:
        a cover member coupled to at least one side of the secondary battery cells on which the electrode tab is disposed, and including a plurality of through-holes configured to provide path of flame or gas,
    wherein the plurality of through-holes are located between the electrode tab and the first cover, and
    wherein the housing further includes a partition wall disposed along a portion in which the first cover is connected to the second cover, and configured to be in direct contact with the module stack and to partition the cooling passage from the flame passage, and the partition wall is formed by bending a portion of the housing.

2. The energy storage system of claim 1, further comprising:
    a spacer disposed between the first cover and the module stack and maintaining a spacing between the module stack and the first cover.

3. The energy storage system of claim 1, wherein the first cover and the second cover are formed by bending a metal plate.

4. The energy storage system of claim 1, further comprising:
    a blocking member disposed in the flame passage and passing gas and blocking flame.

5. The energy storage system of claim 4, wherein the blocking member is formed as a multilayer metal mesh net or a multilayer baffle for cooling flame.

6. The energy storage system of claim 1, further comprising:
    a second cooling passage formed between the stacked battery modules and connected to the cooling passage.

7. The energy storage system of claim 6,
    wherein each of the battery modules includes a protrusion protruding from an upper surface or a lower surface thereof, and
    wherein the second cooling passage is formed in a space between the battery modules spaced apart from each other by the protrusion.

8. The energy storage system of claim 7, wherein the protrusion is disposed adjacent to an edge of the battery module, and is disposed linearly in a direction orthogonal to a length direction of the secondary battery cells.

9. The energy storage system of claim 1, wherein the battery module includes:
    a plurality of cell units, wherein each of cell units among the plurality of cell units accommodate at least one secondary battery cell among the plurality of secondary battery cells; and
    a body frame member integrally combining the plurality of cell units with each other, and
    wherein the cover member is disposed between the flame passage and the electrode tab.

10. The energy storage system of claim 9, wherein each of the cell units includes:
    a cell support member accommodating the at least one secondary battery cell on a side surface portion thereof; and
    a case member surrounding a side surface of the at least one secondary battery cell and coupled to the cell support member.

11. The energy storage system of claim 9, wherein the housing further includes an upper cover disposed in an upper portion of the module stack and a lower cover disposed in a lower portion.

12. The energy storage system of claim 1, wherein the housing further includes a third cover extending from the second cover and disposed on an opposite side surface of the first cover.

13. The energy storage system of claim 1, further comprising:
   a third cover disposed side by side with the first cover and disposed to oppose the other side surface of the module stack on which the electrode tab is disposed,
   wherein each of the first cover and the third cover extends from the second cover.

\* \* \* \* \*